(12) United States Patent  (10) Patent No.: US 7,641,428 B2
Tucker, II  (45) Date of Patent: Jan. 5, 2010

(54) FLOATING FASTENER BASE AND POCKET

(76) Inventor: Gary D. Tucker, II, 46 Pine St., Manchester, CT (US) 06040

( * ) Notice: Subject to any disclaimer, the term of this patent is extended or adjusted under 35 U.S.C. 154(b) by 1393 days.

(21) Appl. No.: 10/234,812

(22) Filed: Sep. 4, 2002

(65) Prior Publication Data

US 2004/0042869 A1   Mar. 4, 2004

(51) Int. Cl.
*F16B 37/00* (2006.01)
(52) U.S. Cl. .................... 411/104; 411/174
(58) Field of Classification Search ........... 411/104, 411/111, 112, 113, 174, 175, 103; 292/341.15
See application file for complete search history.

(56) References Cited

U.S. PATENT DOCUMENTS

| | | | | |
|---|---|---|---|---|
| 3,036,673 A | * | 5/1962 | Santerre | 49/463 |
| 4,768,907 A | * | 9/1988 | Gauron | 411/85 |
| 5,104,270 A | * | 4/1992 | Ritzl | 411/85 |
| 5,193,868 A | * | 3/1993 | O'Toole | 292/341.15 |
| 5,558,369 A | * | 9/1996 | Cornea et al. | 280/800 |
| 6,027,293 A | * | 2/2000 | Beemer et al. | 411/119 |
| 6,644,902 B1 | * | 11/2003 | Cutshall | 411/111 |

\* cited by examiner

*Primary Examiner*—Gary S Hartmann
(74) *Attorney, Agent, or Firm*—Gregory T. Zalecki

(57) ABSTRACT

A floating fastener base and pocket are disclosed. The base and pocket permit the adjustable positioning of a stud, such as a striker bolt, prior to final assembly and tightening. A floating fastener base has one or more flanges which fit within a pocket created by one or more respective flange receptacles formed on a substrate. The floating fastener base is inserted into the floating fastener base pocket. This provides a fastening base for a stud wherein the fastening base and the stud are positionally adjustable prior to final retention of the stud, typically accomplished by tightening of the stud.

4 Claims, 5 Drawing Sheets

FLOATING FASTENER BASE AND POCKET

BACKGROUND

Two-piece fasteners, such as a nut and a bolt, are commonly used in industrial applications for attaching parts together. Some applications require the positioning of the fastener to be adjustable during assembly and that at least one piece of the fastener be usable in limited access areas. In particular, automotive door striker bolt applications require such features.

A striker bolt is a part of an automobile which is attached to a door pillar or similar frame member. A latch is a part attached to an automobile door which securely binds the door to the automobile by engaging with the striker bolt. Similar functioning latches and striker bolts are used to secure automotive hoods, trunks, gloveboxes, lift gates and tailgates. The striker bolt is secured to the pillar by screwing the threaded end of the bolt into a threaded plate located on the opposite side of the door pillar. The alignment of the striker bolt with the latch is critical for the proper functioning of the striker-latch assembly. Therefore, it is important that the position of the striker bolt be adjustable with respect to the pillar.

This adjustability is typically accomplished by installing a floating tapping plate behind the door pillar. The term floating means that the tapping plate is retained in a position stable enough to permit the insertion of a striker bolt, yet movable within a predefined area. The tapping plate provides a threaded base within which the striker bolt may be securely screwed. During vehicle assembly, the striker bolt is loosely fitted into the tapping plate. It is then properly positioned and tightened. After tightening, the striker bolt position is no longer adjustable, but rather locked into the precise position necessary to mate with the door latch and securely hold the door in a closed position. Therefore, it is advantageous to have the tapping plate be positionally adjustable without manual intervention after it is installed.

Two approaches are commonly used to provide for the adjustable positioning of striker bolts during assembly. The first uses a fixed retention plate. The retention plate has openings configured to receive and loosely hold the tapping plate. The retention plate is securely mounted to the inner aspect of the door pillar, typically by welding. The inner aspect of the door pillar is the side of the door pillar opposite the side where the striker bolt is mounted. This area is also referred to hereinafter as the area behind the door pillar. After mounting, the tapping plate is inserted into the retention plate providing an adjustable base for the striker bolt. The second uses a tapping plate having a U-shaped channel on one side. The channel is formed by bending the longitudinal edges of the tapping plate such that they become perpendicular to the tapping plate, thereby creating a channel. A plurality of prongs are formed onto the inner aspect of the door pillar for receiving the tapping plate. The tapping plate is placed into position and the prongs are bent enough to secure the plate into a floating position, but not so much so as to prevent the plate from floating. Additionally, the prongs prevent the tapping plate from rotating when the striker bolt is tightened into it. Both approaches allow the tapping plate to be installed in an area of limited access and permit the striker bolt to be installed without the necessity of simultaneously holding the tapping plate.

Information relevant to attempts to provide positionally adjustable striker bolts can be found in U.S. Pat. Nos. 4,432,575 and 5,193,868. Currently available devices for the adjustable positioning of striker bolts during assembly, including those described within the aforesaid patents, suffer from a number of drawbacks. The cost of manufacture is relatively high. Three-dimensional tapping plates with U-shaped channels are more expensive to manufacture than two-dimensional tapping plates. Further, they require a manufacturing step for bending the prongs after the tapping plate is positioned. Retention plates are expensive to manufacture and install. Often access openings to the required area behind the pillar become more restricted during assembly thereby making it more difficult to properly position the tapping plate before the striker bolt is inserted. During assembly of the vehicle, access to the tapping plate becomes progressively more restricted. If the tapping plate needed to be replaced because of damaged threads, clogged threads or vehicle damage, the original tapping plate installation procedure may not be available because of increased restriction of access to the area. With the prong configuration, the prongs are susceptible to failure when they are subjected to cyclic bending and unbending. The materials upon which the tapping plate may be mounted are limited. The prong configuration requires a malleable metal substrate. The retention plate configuration requires a weldable metal substrate.

There is a need for a simple, low-cost device providing a floating fastener base having the following features. It would be inexpensive to manufacture. Its position would be adjustable within a precisely defined area of float prior to final assembly. It could be used in areas of limited access. When used in such areas of limited access it would be self retaining after being initially installed. It would be easily removable. It could be used with a large variety of substrates.

SUMMARY

The present invention is directed to a device which satisfies these needs. One of the objects of the present invention is to provide a self retained adjustable base for securing a fastening stud, such as a bolt. A floating fastener assembly attains this objective. A floating fastener assembly comprises a floating fastener base pocket and a floating fastener base. Versions of the present invention are directed to a floating fastener based pocket, a floating fastener base and a floating fastener assembly.

The purpose of the floating fastener base pocket is to provide a receptacle for the floating fastener base. The floating fastener base has at least one flange for insertion into the floating fastener base pocket. The floating fastener base also has means for securing a stud.

The term stud includes bolts, screws, pins, dowels and striker bolts. Means for securing a stud include a threaded opening, a threaded socket, a nut, a key receptacle for engaging a key on a stud, a pin, a cotter pin, gluing, welding, molding and force fitting.

The floating fastener base pocket is formed onto a substrate. The substrate has an opening sized and positioned to allow a stud to be inserted through the substrate and secured to the means for securing a stud of the floating fastener base. The substrate can be any material capable of being formed into a pocket, such as steel, plastic and ceramic.

The pocket is comprised of at least one floating fastener base flange receptacle formed as a pocket shaped cavity on the substrate. Preferably, the pocket is formed on the side of the substrate which is opposite to the side of the substrate to which another component is to be attached with the stud. Each flange receptacle is shaped to receive and retain a floating fastener base flange and to retain the floating fastener base within a predefined three-dimensional floating position when the opening within the substrate and the means for securing a stud are aligned such that a stud may be inserted from one side of the substrate, through the substrate, into the means for securing a stud of a floating fastener base on the other side of the substrate.

The floating fastener base is sized and shaped for insertion into the floating fastener base pocket. The floating fastener base is comprised of a plate and means for securing a stud to the plate. The plate has at least one flange. Each flange is shaped to fit within a flange receptacle of the floating fastener base pocket. Each flange and its respective flange receptacle are sized and shaped such that the floating fastener base will be retained within the predefined three dimensional floating position when each floating fastener base flange is inserted into its respective floating fastener base flange receptacle.

The means for securing a stud to the plate is positioned on the plate such that a stud may be inserted through the substrate opening into the floating fastener base means when the floating fastener base is inserted into the floating fastener base pocket.

Preferably, the floating fastener base pocket further comprises a beaded strip and the floating fastener base further comprises an alignment member. The beaded strip and the alignment member provide better retention of the floating fastener base and allow the three dimensional floating position to be more precisely defined. The beaded strip is formed onto the substrate. The beaded strip is positioned on the substrate and has an opening positioned and shaped to receive an alignment member of the floating fastener base. When the alignment member of the floating fastener base is placed within the opening of the beaded strip the floating fastener base is aligned and retained within a confined floating position such that the floating fastener base floats within the predefined three dimensional floating position. The alignment member of the floating fastener base is shaped and sized to fit within the opening of the beaded strip. The alignment member, together with the beaded strip, align and retain the floating fastener base within the confined floating position such that the floating fastener base floats within the predefined three dimensional floating position.

Preferably, the means for securing a stud is comprised of a threaded socket within the plate for engagingly receiving and securing a threaded bolt and the opening within the substrate is sized and positioned to allow the threaded stem, but not the head, of the bolt to be inserted through the substrate and secured to the socket. Floating fastener bases with such sockets are known as tapping plates. Floating fastener base pockets adapted to receive tapping plates are termed tapping plate pockets herein. This invention is ideal for use in automotive door applications wherein the substrate is a door pillar formed from sheet metal. The threaded socket is adapted to receive a threaded striker bolt. The opening within the substrate is sized and positioned to allow the threaded stem, but not the shoulder, of the striker bolt to be inserted through the substrate and secured to the socket. To use the floating fastener base assembly within an automotive door application a floating fastener base pocket is formed onto the inner aspect of a door pillar. A floating fastener base is inserted into the pocket. A striker bolt is then inserted into the threaded socket of the floating fastener base and loosely tightened. The position of the striker bolt is then adjusted to obtain optimal alignment with the door striker. After such alignment is obtained, the striker bolt is securely tightened.

DRAWINGS

These and other features, aspects, and advantages of the present invention will become better understood with regard to the following description, appended claims, and accompanying drawings where:

DESCRIPTION

Several embodiments of the present invention are shown in FIGS. 1 through 10.

Figure 1:
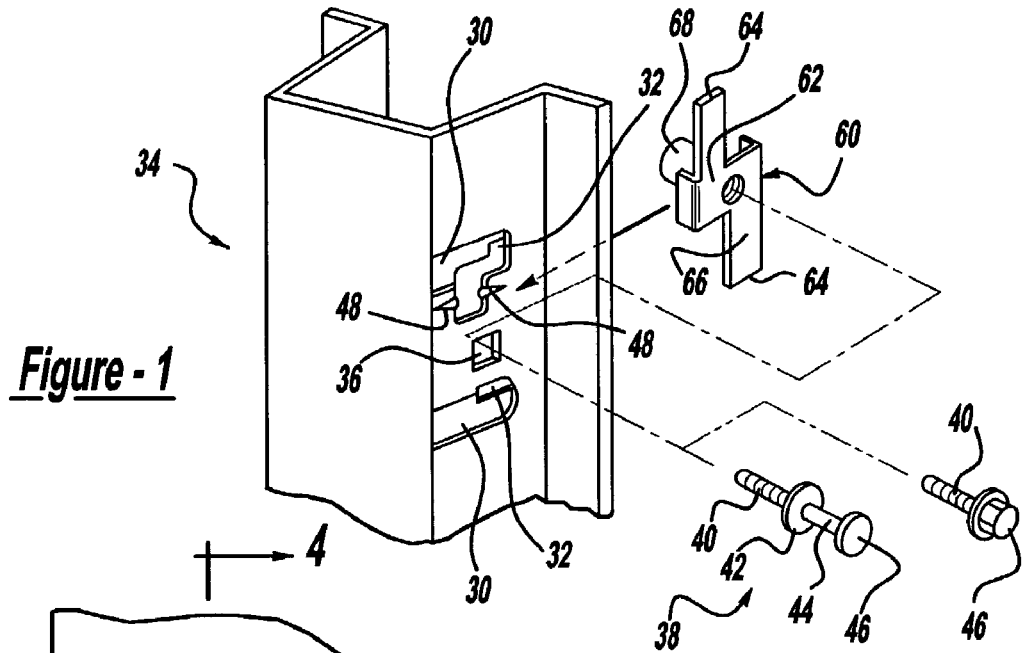
FIG. 1 is a perspective view of a floating fastener base, a floating fastener base pocket formed onto an automotive door pillar and a striker bolt.
Figure 2:
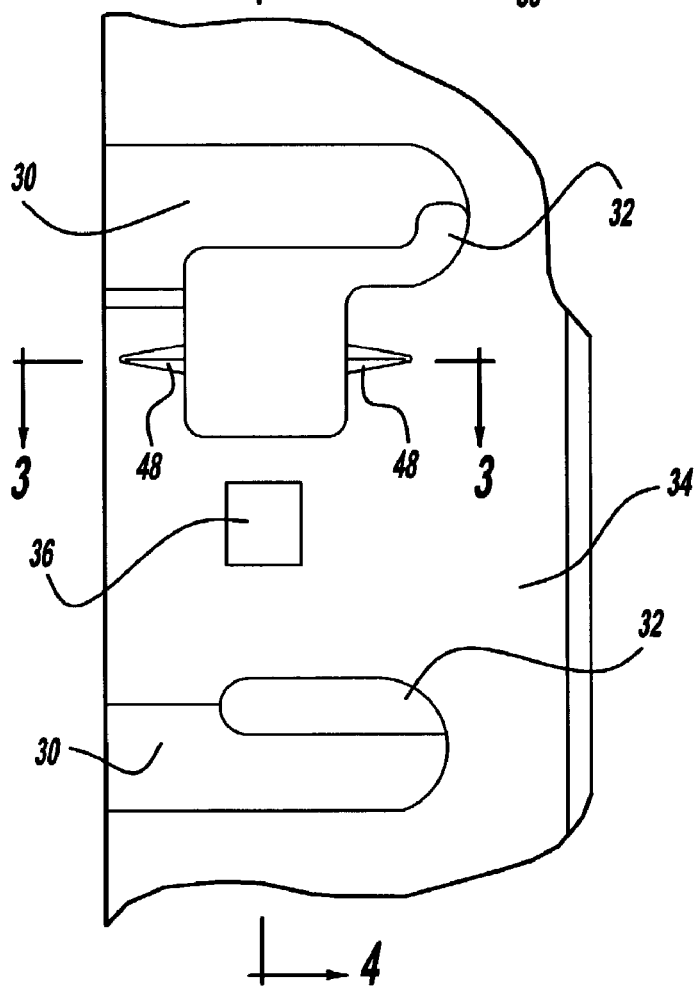
FIG. 2 is a top view of the floating fastener base pocket of FIG. 1.
Figure 3:
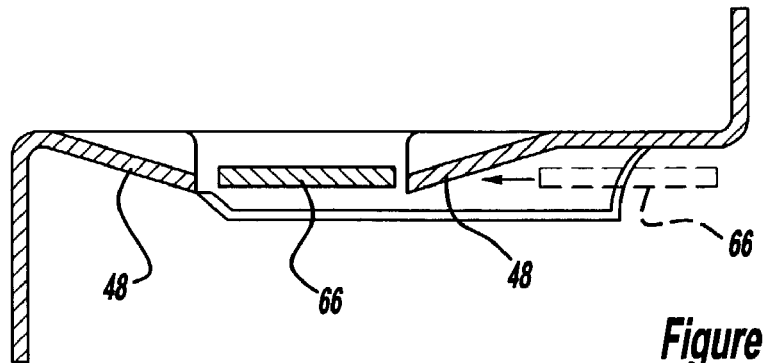
FIG. 3 is a cross-sectional view at line 3-3 of the floating fastener base pocket of FIG. 2.
Figure 4:
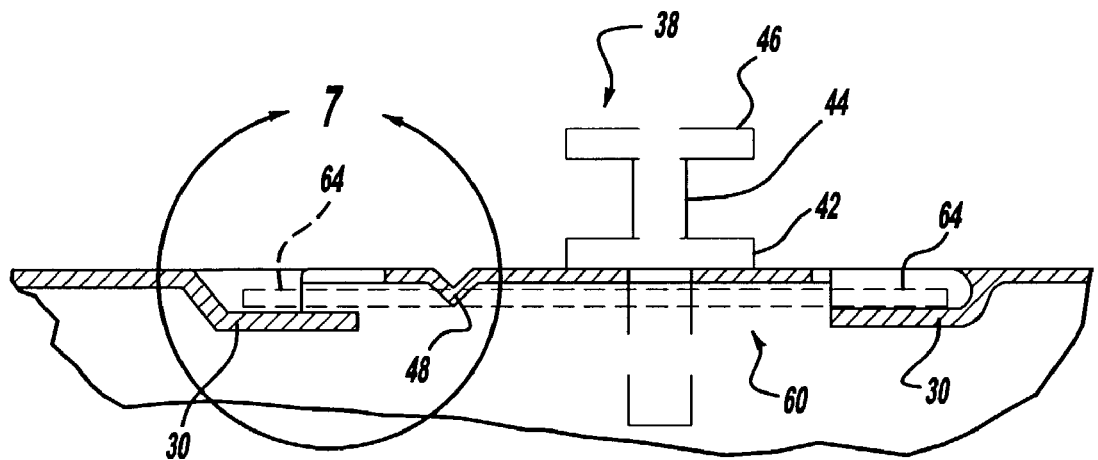
FIG. 4 is a cross-sectional view at line 4-4 of the floating fastener base pocket of FIG. 2.
Figure 5:
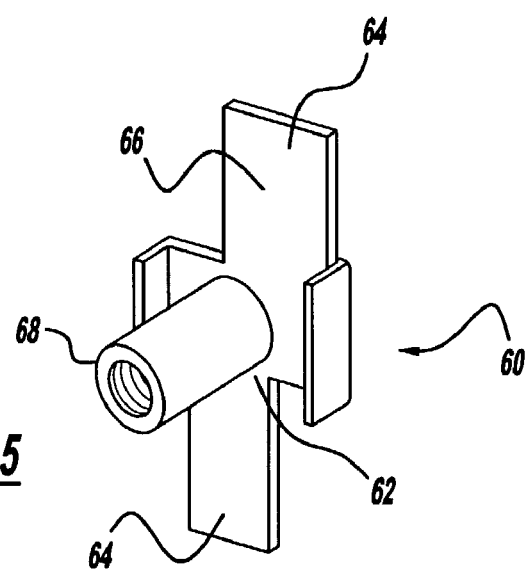
FIG. 5 is a perspective view of the floating fastener base of FIG. 1.
Figure 8:
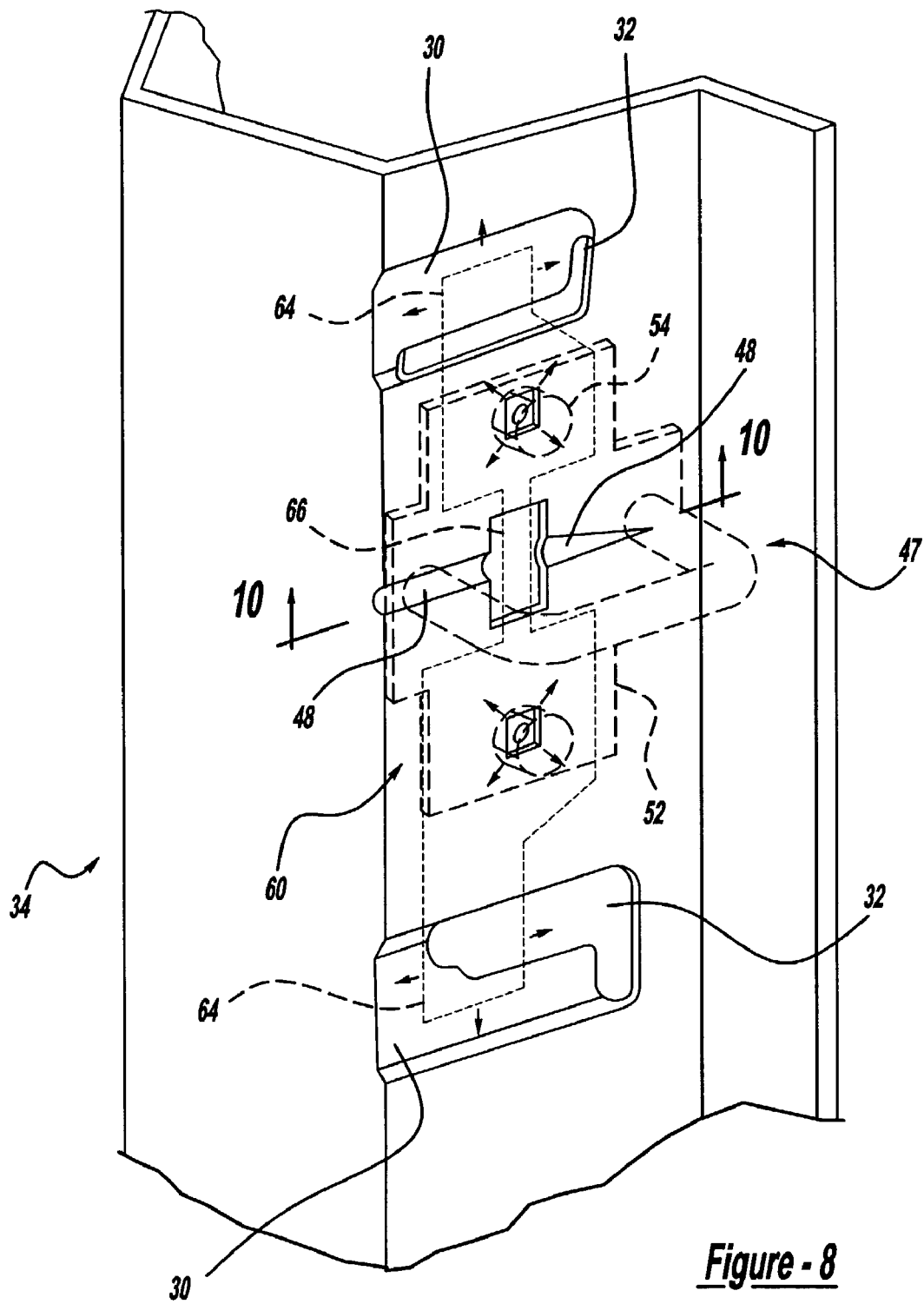
FIG. 8 is a perspective view of an alternate embodiment of a floating fastener base, a floating fastener base pocket formed onto an automotive door pillar and a U-shaped striker.

The best mode of use for the present invention is within an automotive door application. FIG. 1 and FIG. 8 show a substrate which is an automotive door pillar 34 formed from sheet metal. Two flange receptacles 30 are formed onto the door pillar 34 as pocket shaped cavities, thereby forming a floating fastener base pocket. Each flange receptacle 30 has an opening 32. Each flange receptacle 30 is shaped to receive and retain a floating fastener base flange 64 and to retain a floating fastener base 60 within a predefined three dimensional floating position. The door pillar 34 has at least one opening 36 which is sized and positioned to allow a striker bolt 38 to be inserted through the door pillar 34 and into a socket 68 of a floating fastener base 60 which is inserted into a flange receptacle 30. The door pillar opening 36 is sized to allow the threaded stem 40 of the striker bolt 38 to be inserted through the opening 36 while preventing the shoulder 42, neck 44 and head 46 of the striker bolt 38 from passing through the opening 36.

Preferably, a beaded strip 48 is formed onto the door pillar 34. The beaded strip 48 is positioned on the door pillar 34, and has an opening positioned and shaped, to receive an alignment member 66 of the floating fastener base 60. The interaction between the alignment member 66 and the beaded strip 48 causes the floating fastener base 60 to be aligned and retained within a confined floating position such that the floating fastener base 60 floats within a precise predefined three dimensional floating position.

The beaded strip 48, flange receptacles 30 and flange openings 32 are preferably formed at the time the automotive door pillar 34 is formed. A two-step stamping process is used. In the first step, the flange receptacles 30 are formed onto the inner aspect of the door pillar substrate. In the second step, the flange receptacle openings 32 are stamped. The door pillar 34 may also be formed, wholly, or in part, during these two steps.

The floating fastener base 60 is sized and shaped to fit within the floating fastener base pocket formed by the flange receptacles 30. The floating fastener base 60 is comprised of a plate 62 and a threaded socket 68. Preferably, the plate 62 has two flanges 64 as shown by the alternate floating fastener base configurations depicted in FIG. 5 and FIG. 9. Each flange 64 is shaped to fit within a respective flange receptacle 30 of the floating fastener base pocket. Each flange 64 and its respective flange receptacle 30 are sized and shaped to permit the flange 64 to fit within the respective flange receptacle 30 and to retain the floating fastener base 60 within a predefined three dimensional floating position. Preferably, the plate 62 has an alignment member 66 shaped and sized to fit within the opening of the beaded strip 48 such that the interaction between the alignment member 66 and the opening within the beaded strip 48 cause the floating fastener base 60 to be aligned and retained within a confined floating position such that the floating fastener base 60 floats within a precise predefined three dimensional floating position.

The threaded socket 68 is positioned, shaped and threaded to engagingly receive and secure the threaded stem 40 of a striker bolt 38 when the floating fastener base 60 is inserted into the floating fastener base pocket, thereby forming a floating fastener assembly 50.

Figure 9:
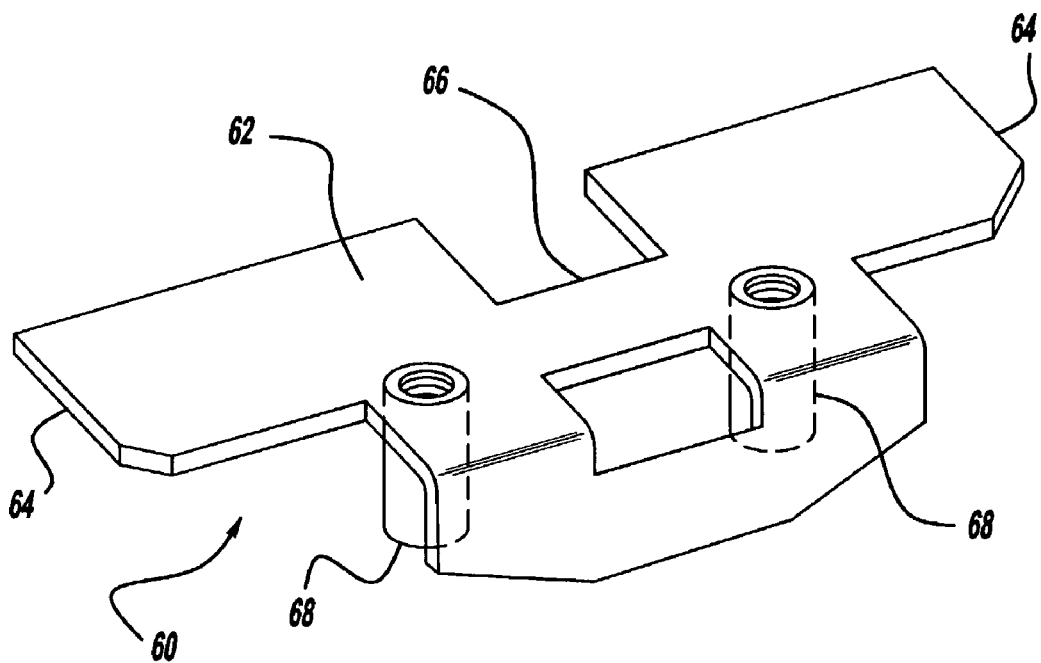
FIG. 9 is a perspective view of the alternate embodiment of the floating fastener base of FIG. 8.
Figure 10:
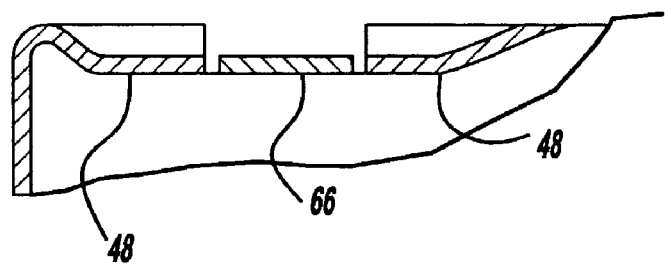
FIG. 10 is a cross-sectional view at line 10-10 of the floating fastener base pocket of FIG. 8.

A floating fastener base 60 and a floating fastener base pocket formed by one or more flange receptacles 30 may be used to secure both single stud striker bolts 38 as shown in FIG. 1 and U-shaped strikers 47 as shown in FIG. 8. U-shaped strikers 47 include a base 52 through which bolts may be inserted. The terms striker bolt includes bolts used to attach a U-shaped striker 47 to a floating fastener base 60. A U-shaped striker 47 is attached to an automotive door pillar 34 by inserting bolts through the openings 54 within the striker base 52 into the threaded sockets 38 of a dual socket floating fastener base 60, as shown in FIG. 9, positioned on the inner aspect of the door pillar 34, as shown in FIG. 8. Before the bolts are inserted the floating fastener base 60 is retained and positioned by the flange receptacles 30 and the opening within the beaded strip 48.

Most automotive door pillars 34 are stamped from malleable sheet metal. The preferred material for a floating fastener base pocket and a floating fastener base is malleable sheet metal.

The use of floating fastener base pockets formed from flange receptacles 30 and floating fastener bases 60 to attach parts together with bolts, and more particularly striker bolts, has numerous advantages over the prior art. Welding of tapping plates or retention plates to a substrate is not needed. Prongs need not be formed on the substrate for retaining a tapping plate. The tapping plate need not be held in position while the prongs are bent around its edges. Floating fastener base pockets and floating fastener bases can be constructed from almost any solid material, including steel, malleable sheet metal, plastic and ceramic. Product weight and material reductions are easily obtained.

Floating fastener base pockets and floating fastener bases can be used outside of the automotive door striker application. They can be used to adjustably secure automotive glovebox strikers, automotive trunk strikers, automotive hood strikers, liftgate strikers and tailgate strikers. Their use is not limited to striker applications. Almost any application currently using a bolt and a threaded socket, such as a nut, may substitute a floating fastener base inserted into a floating fastener base pocket for the threaded socket.

Figure 6:
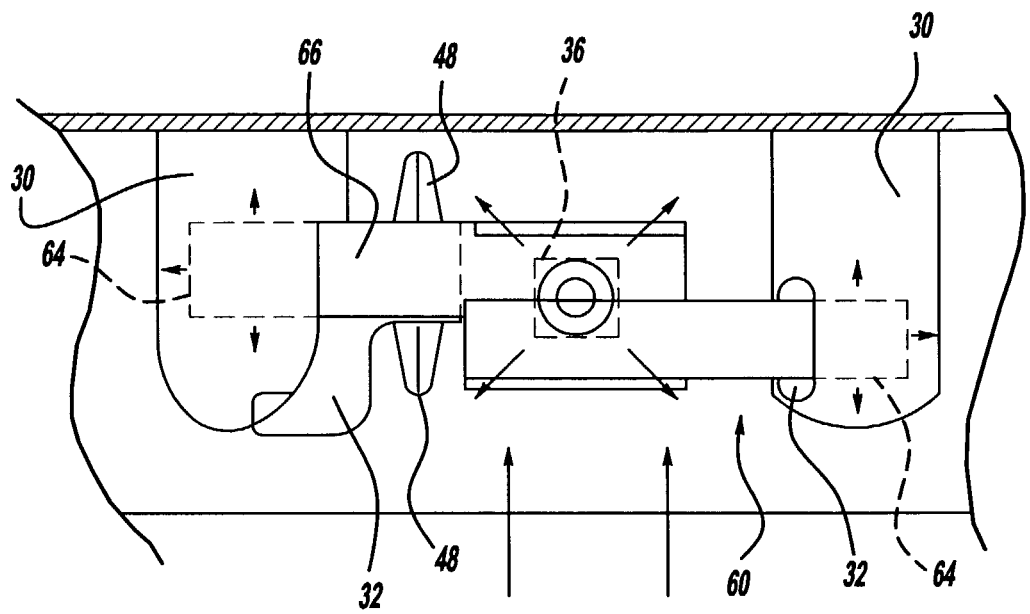
FIG. 6 is a bottom view of the floating fastener base and floating fastener base pocket of FIG. 1 showing the floating fastener base inserted into the floating fastener base pocket, and further showing the floating movement of the floating fastener base.
Figure 7:
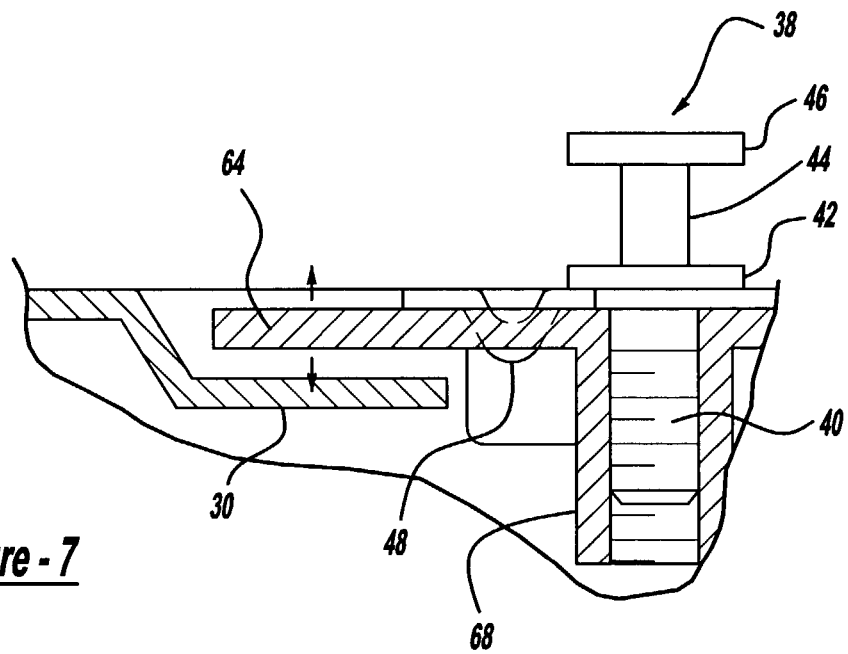
FIG. 7 is an enlarged view of a section of FIG. 4 showing available movement of the floating fastener base in the direction perpendicular to the door pillar.

The manner of using a floating fastener base and a floating fastener base pocket has been previously described within the summary section. The manner of use is graphically depicted within FIGS. 3, 4, 6, 7, 8 and 10. When the floating fastener base 60 is inserted into the pocket formed by the flange receptacles 30 the alignment member 66 of the floating fastener base 60 becomes positionally trapped within the opening of the beaded strip 48 as shown in FIGS. 3, 4, 7, 8 and 10. Such trapping causes the floating fastener base 60 to be positionally retained within a predefined three dimensional floating position as shown in FIGS. 6, 7 and 8.

What is claimed is:

1. A floating tapping plate pocket for retaining a tapping plate to an automotive door pillar such that said tapping plate provides a base for attaching a threaded bolt to the automotive door pillar, the tapping plate having at least one flange and a threaded opening for securing the threaded bolt, the tapping plate pocket comprising:

(a) an automotive door pillar having an opening sized and positioned to allow the threaded stem, but not the head, of a bolt to be inserted through the automotive door pillar and secured to the threaded opening of the tapping plate; and (b) at least one tapping plate flange receptacle formed as a pocket shaped cavity on the automotive door pillar, each flange receptacle being shaped to receive and retain a tapping plate flange and to retain the tapping plate within a predefined three-dimensional floating position when the opening within the automotive door pillar and the threaded opening within the tapping plate are aligned such that the threaded stem of a bolt may be inserted from one side of the automotive door pillar through the automotive door pillar into the threaded opening of the floating fastener base on the other side of the automotive door pillar.

2. The floating tapping plate pocket of claim 1, further comprising:

(a) a beaded strip formed onto the automotive door pillar, the beaded strip being positioned on the automotive door pillar, and having an opening positioned and shaped, to receive an alignment member of the tapping plate for aligning and retaining the tapping plate within a confined floating position such that the tapping plate floats within a predefined three-dimensional floating position.

3. The floating tapping plate pocket of claim 1, wherein the opening within the automotive door pillar is sized and positioned to allow the threaded stem, but not the shoulder, of a striker bolt to be inserted through the automotive door pillar and secured to the threaded opening of the floating fastener base.

4. The floating tapping plate pocket of claim 2, wherein the opening within the automotive door pillar is sized and positioned to allow the threaded stem, but not the shoulder, of a striker bolt to be inserted through the automotive door pillar and secured to the threaded opening of the floating fastener base.

* * * * *